July 17, 1934.  R. DECOUX  1,966,540
TRANSFORMABLE CARRIAGE BODY
Filed Dec. 5, 1929

Inventor:-
Robert Decoux
by
Langner, Parry, Card & Langner
Attys.

Patented July 17, 1934

1,966,540

UNITED STATES PATENT OFFICE 1,966,540

TRANSFORMABLE CARRIAGE BODY

Robert Decoux, Ciney, Belgium

Application December 5, 1929, Serial No. 411,965
In Belgium December 10, 1928

3 Claims. (Cl. 296—137)

The present invention relates to a transformable carriage body for automobile vehicles having a sliding part in the roof.

In the known bodies of this type, the sliding part is guided by longitudinal members which take support at one end on the wind screen and on the other hand on the fixed part of the roof, these longitudinal members serving at the same time as stops for the doors. When the sliding part is brought on to the fixed part, these longitudinal members impede the view overhead and prevent access to the seats in a standing position.

In order to remove these disadvantages, the present invention provides for the front part of the roof which slides to be guided in its movements by a central guide, the said sliding part serving as a stop for the doors when it occupies the position in which the roof is closed.

The displacement of the sliding part may be effected easily without jamming with the parts on which it slides, on account of a certain amount of clearance which is left between it and the said parts. In order to prevent the sliding part making any noise during the travel of the vehicle in spite of the said clearance, the invention provides for it being locked in all its positions.

When this locking is effected by bolts the invention provides for the central guide to be capable of serving for controlling at the same time the displacement of these bolts. In one special form of construction, the said displacement of the bolts is obtained by rotating a rod serving as a central guide and connected to the said bolts by cables.

The invention also provides for the displacement of the sliding part of the roof to be adapted to be controlled by a motor.

Another object of the invention consists in fixing the said central guide on the fixed part of the roof and to the wind-screen in such a way as to hold the wind-screen at a constant distance from the fixed part of the roof.

In order to prevent air from entering between the sliding part of the roof and the doors, in the case when the latter are in the same plane as the fixed part of the side faces of the body, the invention provides for the upper part of these doors to comprise a flange which presses on the outside of the lateral edge of the sliding part.

The invention finally provides for a transverse groove to be arranged towards the front of the fixed and movable parts, this groove being adapted to make water, collecting on the roof, flow on to the sides of the vehicle.

Other details and features of the invention will appear from the following description of the accompanying drawing, which accompanies the present specification and which illustrates some forms of construction of the invention, diagrammatically and simply by way of example.

Figure 1:
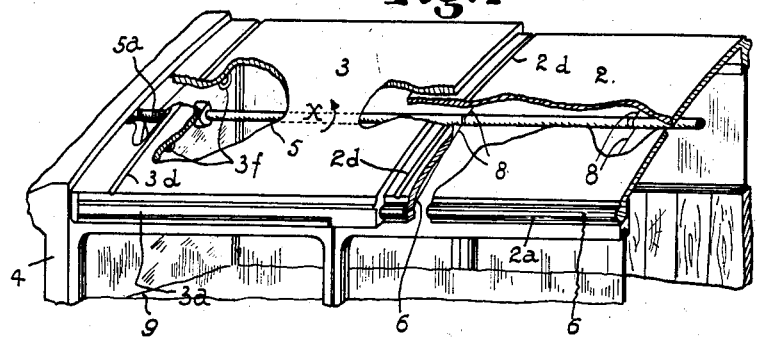
Figure 1 is a perspective view of a carriage body roof with parts cut away.

Figure 1 shows the upper part of a motor carriage body comprising a fixed part 2 and a sliding part 3. The sliding part 3 is arranged towards the front of the vehicle when the roof is completely closed. In this position, the sliding part 3 rests towards the rear on the fixed part and towards the front in the frame of the wind-screen 4.

The lateral edges 3a of the sliding part 3 serve as longitudinal members for the said sliding part and are rigid therewith. The displacement of the sliding part 3 is guided by a central guide formed by a rod 5 around which is engaged a ring 3b rigid with the sliding part 3.

In this way, when the sliding part 3 covers the fixed part 2, the front seats may be entered from a standing position.

The lateral sides 3a of the sliding part 3 can slide with a certain amount of clearance along ribs 2a provided upon the side of the fixed part 2. In this way, any jamming of the sliding part 3 with respect to the fixed part 2 is avoided.

Figures 2, 4, 5:
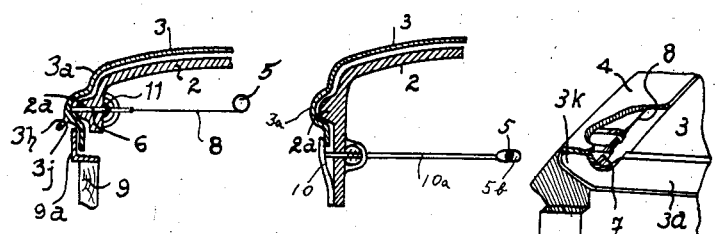
Figure 2 shows in cross section a method of locking the sliding part.
Figure 4 is a cross section through the lateral edge of the sliding part of the roof and a door in the closed position.
Figure 5 shows a detail in perspective.

In order to prevent the production of any noise due to this play, the invention provides for the sliding part 3 being locked in all its positions by means of bolts. These bolts are arranged for example in the fixed part of the roof, such as those shown at 6 (Figure 1) and in the wind-screen, such as those shown at 7 (Figure 5). They are constantly drawn towards their locking position by springs 11. They can be separated for example by turning the rod 5 in the direction of the arrow X by means of a hand grip 5a, cables such as 8 being connected on the one hand to the said rod and on the other hand to the bolts 6 and 7.

At the front, the locking of the sliding part in the frame which surrounds it may also be effected by wedging beaks 3k in the wind-screen frame.

The sliding part 3 may also be locked by means of plates such as 10 rigid with the rods 10a continually acted upon by springs 10b so as to grip the edges 3a between them and the fixed part 2.

In order to produce the displacement of the sliding part, the said plates 10 may first of all be separated from the edges 3a by acting on the rods 10a by means of cams 5b keyed on the rod 5.

The rod 5 serving as a central guide for the sliding part 3 is secured on the one hand to the fixed part 2 and on the other hand to the wind-screen frame 4. It thus prevents the wind-screen from approaching or moving away from the fixed part of the roof as a result of deformations of the body.

In order to prevent water accumulating at the ends of the sliding part 3, where fluid tight joints are naturally provided, according to the invention, a transverse groove 2d or 3d is provided in front of the fixed part 2 and the sliding part 3 by means of which groove the water collecting on the proof flows down the sides of the body.

Figure 3:
Figure 3 is a view of a central guide according to the invention, the rotation of which produces the longitudinal displacement of the sliding part.

Instead of moving the sliding part 3 by means of handles 3f, as shown in Figure 1, according to the invention this displacement may also be obtained by a motor such as an electric motor 10c for example. The motor may serve for rotating the rod 5 which in this case, as shown in Figure 3, will comprise a screw threaded part around which will be engaged a nut rigid with the sliding part 3. It may also be displaced by cables along the longitudinal axis of the vehicle, these cables being connected to the sliding part of the roof.

When the sliding part 3 is situated towards the front, if the door 9 is in the closed position, in the same plane as the fixed part of the side wall of the body of which it forms a part, the invention provides for this door to have a flange 9a which presses against the edge 3a of the sliding part 3. This flange 9a prevents air from entering the body. It is arranged below a projection 3h on the edge 3a, the said projection forming a tooth 3j preventing water from filtering into the body.

It is obvious that the invention is not exclusively limited to the forms of construction shown and that many modifications may be made in the form and arrangement of the parts intervening in its construction without going outside the scope of the invention. Thus for example the bolts may be controlled by the longitudinal displacement of a tube concentric with the rod 5, this tube carrying cams which act in a suitable direction on rods or cables connected to the said bolts.

What I claim is:

1. A transformable carriage body, comprising a front fixed member, a roof with a rear fixed part and with a front movable part adapted to slide with a certain clearance on the rear fixed part, a single central guide for the said sliding part, the said guide being secured at one end on the rear fixed part of the roof and on the other end on the front fixed member and locking means mounted on the fixed part of the roof and acting on the lateral edges of the sliding part.

2. A transformable carriage body, comprising a front fixed member, a roof with a rear fixed part and with a front movable part adapted to slide with a certain clearance on the rear fixed part, a single central guide for the said sliding part, the said guide being secured at one end on the rear fixed part of the roof and at the other end on the front fixed member, bolts for locking the sliding part mounted on the fixed part of the roof and acting on the lateral edges of the sliding part, and a mechanical connection between the bolts and the single central guide for displacing the bolts by means of the central guide.

3. A transformable carriage body, comprising a front fixed member, a roof with a rear fixed part and with a front movable part adapted to slide with a certain clearance on the rear fixed part, a single central guide for the said sliding part, the said guide being secured at one end on the rear fixed part of the roof and at the other end on the front fixed member, means for rotating said single central guide, bolts for locking the sliding part mounted on the fixed part of the roof and acting on the lateral edges of the sliding part and cables connected to said rotating guide and to the bolts.

ROBERT DECOUX.